Oct. 2, 1956     G. S. DIAMOND     2,765,074
PROCESS FOR SEPARATING ORES
Filed Feb. 11, 1955     2 Sheets-Sheet 1

INVENTOR.
GRANT S. DIAMOND
BY
ATTORNEY

United States Patent Office 2,765,074
Patented Oct. 2, 1956

2,765,074

PROCESS FOR SEPARATING ORES

Grant S. Diamond, Hamburg, N. Y.

Application February 11, 1955, Serial No. 487,533

34 Claims. (Cl. 209—3)

This invention relates to methods of processing pegmatites, granites, silicious rocks, sands from pegmatites or granites, and in particular silicious minerals such as feldspar.

Feldspar is a generic name for a series of aluminum silicate minerals which are commercially classified as potash, soda, or lime spars. In actual mining, processing and marketing, the feldspars are generally a mixture of these three varieties and are described as high potash feldspar, high soda feldspar, lime feldspar and lime soda feldspar. Mineralogically the feldspars are classified as follows:

Potash spar_____ Orthoclase, microcline.
Soda spar_____ Albite.
Lime spar_____ Anorthite.
Lime-soda spar_____ Oligoclase, andesine, labradorite, bytownite.

The principal commercial feldspar minerals are orthoclase, microcline, albite and anorthite. None of these are pure products or pure classes but contain at least two varieties. Orthoclase and microcline generally have a minor content of albite. Albite generally contains some anorthite.

The present world wide annual consumption of feldspars is reported by the United States Bureau of Mines, as being about 800,000 long tons. More than half of this tonnage is produced and consumed in the United States. The largest recorded sales in the United States were 508,-380 long tons in 1946. Other feldspathic materials which are used in the United States instead of feldspar amount to another 100,000 long tons per year. The chief competing material is nephelite or nepheline syenite, which had sales of 89,000 tons in 1953. Another product is aplite, which had sales of about 50,000 tons in 1949. The heaviest domestic consumer of feldspathic products is the glass industry which uses about 60% of the domestic output.

High potash feldspar is preferred by the United States ceramic industries, which include glass, chinaware, floor and sidewall tile, sanitary ware and other forms of pottery ware. Feldspars which contain about equal parts of potash and soda are a second choice and high soda feldspars are also used in these industries as a third choice to potash spars. Lime and lime-soda feldspars are used in some glasses.

The mining of minerals such as feldspars has traditionally been a selective operation wherein the pegmatite mineral deposits have been worked at zones or faces where there were rich concentrations of large crystals. Leaner zones were necessarily by-passed due to the low yield of high grade product which low yield would make the cost per ton of the product uneconomical. The selective mining method consists in blasting a rock face with dynamite to produce broken ore of a sizing suitable for hand-cobbing. The loose rock is then cobbed with hand hammers to separate the quartz, mica, tourmaline and other undesired minerals from the feldspar. The hand-cobbed feldspar is then loaded on trucks for transportation to the grinding mill. The discard material or waste is transported to a dump.

There have been two serious problems with this selective mining process which have been distressing the feldspar industry in recent years. One is the steady increase in wage rates which trend started during World War II. The other problem is the rapid disappearance of rich deposits. High grade potash feldspar reserves have been gradually diminishing over the last twenty-five years and many operators have been forced to relax their product specifications in order to market a feldspar at competitive prices. Labor costs have forced some mechanization of the hand-cobbing procedure. Instead of hand-sorting and hand-cobbing at the mining face, many operators now bulk mine and convey the mineral on belts to hand-picking crews. This is called the picker-belt method. Others have made a similar improvement by conveying the bulk mined mineral to elevated hoppers where it feeds by gravity to hand-picking tables. The productivity per man hour is thus improved.

The quality of hand-cobbed spar, however, has declined, both by the necessary pressure for greater productivity and by the depletion of the former rich deposits. A standard high potash feldspar formerly analyzed a maximum of 67% silica. Today, most high potash feldspars analyze 69% $SiO_2$. A high grade potash feldspar formerly analyzed 10% potash. Today, most potash feldspars have only 8.0% potash.

The most effective manufacturing improvement in the production of feldspar has been the adoption of a bulk mining and wet flotation method. This method has eliminated hand labor and produces a very consistent product. It is a lower cost method than hand-cobbing and currently is the competitive factor which establishes the sales price of feldspar. Flotation spar has been steadily gaining favor in the ceramic industries although it can hardly be classified as a high potash feldspar. It is considerably lower in potash and higher in soda than the former standard potash feldspars. A typical flotation spar analyzes 66% $SiO_2$, 6% potash and 5% soda. This spar has been acceptable to the glass industry but has found slower acceptance in the chinaware, porcelain and other ceramic industries. The fusibility and vitrifying action is considerably different from standard potash feldspars. Currently, however, flotation spars from the North Carolina-Tennessee area account for about 30% of the United States feldspar consumption. Additional flotation plants are now being planned in the South.

Although the flotation process is a lower cost operation than the selective hand-cobbing method, it still is not a cheap process. The cost of chemical reagents alone in froth flotation of feldspar is $1.00 per ton of mineral processed. The yield of good product is far below the theoretical feldspar content of the mineral, since much good feldspar is washed out in the de-sliming step of the process. De-watering and drying must be followed by a roasting to remove organic fatty acids from the feldspar, particularly if the spar is intended for pottery use. The cost of flotation is a minimum of $5.00 per ton on the feldspar produced. This is not low enough to successfully compete in the United States glass plants with nepheline syenite from Canada, except where transportation costs favor the feldspar substantially. The glass industry buys nepheline or feldspar based on the unit cost of the alumina and alkalies contained in these minerals. Nepheline has more units of these items per ton than feldspar and, therefore, warrants a higher delivered price per ton to any particular glass plant. 20-mesh nepheline is priced at $14.00 per ton f. o. b. Lakefield, Ontario. 20-mesh feldspar is priced at $12.00 per ton f. o. b. Kona, North Carolina. At points where both products deliver at the same price, such as Corning, New York, the nepheline syenite is more economical to use than feldspar because of higher content of alumina and alkalies. The trend has strongly been toward the purchase of more and more nepheline syenite because of the delivered unit cost factor and nepheline syenite has now reached a sales volume of 100,000 tons per year, at the expense of the feldspar industry. If the cost of feldspar production could be reduced about $2.00 per ton, the trend would be reversed since the lower unit costs of the valuable ingredients would then favor feldspar.

It is an object of this invention to provide a method of processing pegmatite minerals or the like which accomplishes a major reduction is cost of producing feldspar, mica, quartz and other minerals as compared to prior processes.

It is a further object of this invention to provide a completely mechanized method of processing ores.

Another object of this invention is to provide a dry method of processing minerals as opposed to present "flotation" and "chemical" processes.

A further object of this invention is to provide a method of reclaiming minerals from discard or scrap piles.

Still another object of this invention is to provide a method of processing ores which is applicable to various grades of minerals and does not reqiure high grade deposits.

A still further object of this invention is to provide a method of processing ores which avoids the necessity of having to chemically treat the mineral prior to or during the processing.

Still another object of this invention is to provide a method of processing minerals which does not require the application of high roasting temperatures.

A further object of this invention is to provide a method of obtaining high grade feldspar from a low grade feldspar ore hitherto not commercially possible because of high cost.

Yet another object of this invention is to provide a method of processing pegmatite minerals so as to obtain a substantially higher yield than is possible with present popular froth flotation methods.

Another object of this invention is to provide a method for separating mixtures of crystalline material or crystals.

These and other objects and advantages will be apparent from the following description and claims.

In the accompanying drawings which illustrate by way of example various embodiments of this invention:

Figure 1:
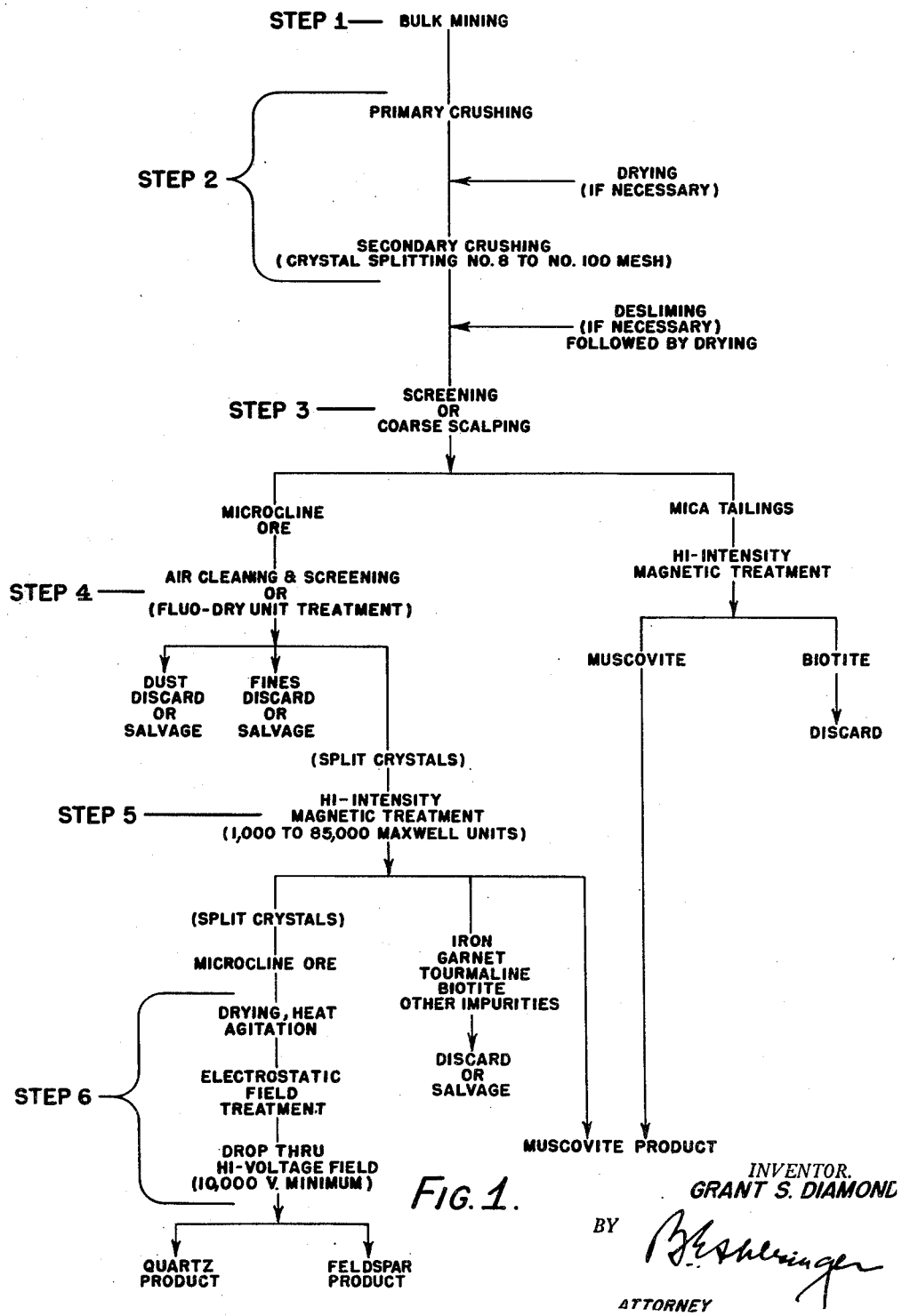
Fig. 1 is a flow diagram illustrating the various steps for processing ore according to one embodiment of this invention.
Figure 2:
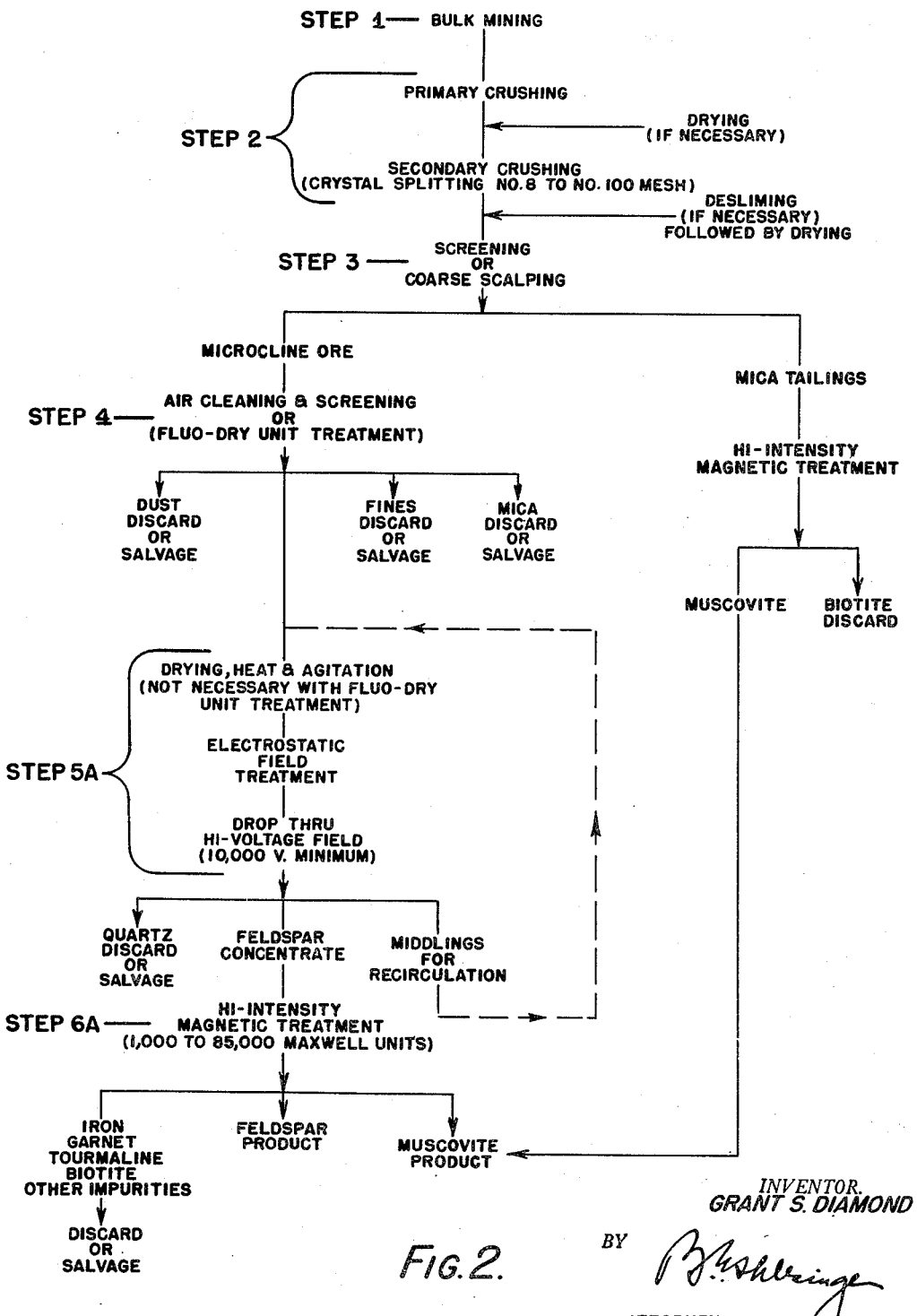
Fig. 2 is a flow diagram illustrating the various steps of an alternative method for processing ore according to a further embodiment of this invention.

In general, the method of processing pegmatite minerals as accomplished by this invention consists of six major steps. The order of these steps may be changed as shown in Figs. 1 and 2. Taking Fig. 1 the process consists of:

(1) Bulk mining of the pegmatite ore
(2) Crushing to produce split crystals
(3) Screening out of flake mica
(4) Screening plus air cleaning of the crushed grains to remove dust coatings on the important mineral crystals or fluo-dry unit treatment
(5) Subjecting the crushed mineral to a range of various selected fields of high-intensity induced magnetism, followed by
(6) Subjecting the split crystals to a field of electrostatic force The process of this invention has proven successful on laboratory samples from three different pegmatite dikes, from widely separated geographic locations, and has also proven successful on laboratory samples from two feldspathic pegmatite scrap piles, in New England. To describe the process in more detail, reference will be made first to deposit X, which is one of the successful projects mentioned among these five.

Geological examinations and surveys made indicated that the pegmatite dike under study contained millions of tons of white pegmatite, which largely consisted of graphic granite, with considerable content of feldspar, but well interspersed with excess amounts of quartz, a small amount of muscovite, a small percentage of biotite, and with some tourmaline and garnet. The examinations and surveys showed that hand-cobbing was not recommended but that flotation might prove economical. The elevation of the dike was suitable for bulk mining and working faces up to 100' in height and several thousands feet long or wide were easily possible. The location was ideal for low cost transportation, being only a few hundred yards from navigable sea water.

STEP 1

Bulk Mining

A bulk sample was blasted from an average appearing area on the side of the exposure. The entire quantity was taken for processing. A chemical analysis was made of the bulk sample. The analysis was as follows:

|  | Percent |
|---|---|
| Ignition loss | 0.3 |
| $SiO_2$ | 74.5 |
| $Al_2O_3$ | 14.0 |
| $Fe_2O_3$ | 0.6 |
| $Na_2O$ | 2.6 |
| $K_2O$ | 7.0 |
| CaO | 1.00 |
| MgO | tr. |
|  | 100.00 |

The analysis indicated that the rock was disappointing. The quartz was evidently much higher than appeared on casual inspection. The rock was classed as pegmatite.

It was estimated that the silica content would probably be too high for a commercial feldspar. Careful study was then made of several lump samples of the pegmatite mineral under a magnifying glass to determine the nature of the quartz and feldspar crystallization and segregation. It was found that microcline feldspar crystals were the principal crystals present and that these crystals were of large size. In fact, the microcline was the mass of the mineral and appeared to be the matrix in which, or from which, the quartz, biotite, tourmaline and other minerals had crystallized. The quartz was crystallized more or less at random throughout this matrix of microcline, in pockets and in layers, and the segregations of quartz were of varying sizes from $\frac{1}{16}''$ cross-section up to $\frac{1}{4}''$ cross-section. The pockets were mostly $\frac{1}{4}'' \times \frac{1}{4}'' \times \frac{1}{4}''$ although there were several pockets of $\frac{1}{8}'' \times \frac{1}{8}'' \times \frac{1}{8}''$. There were also aggregates of quartz crystals which occupied areas covering as much as $\frac{3}{4}''$ having a variable thickness from $\frac{1}{16}''$ up to $\frac{3}{8}''$. These aggregates appeared to be stringers and to have acted as crystal seedlings upon which the biotite and muscovite mica and other dark colored impurities had crystallized. These stringers of quartz throughout the microcline matrix produced the phenomenon which is called "graphic granite," since on an exposed surface the stringers produced a resemblance to hieroglyphics or inscriptions due to dark lines against the white background of microcline. Examinations indicated that the grain sizes of the principal crystalline ingredients of the mineral were coarse enough for beneficiation. Particularly indicated was the probability that not only would the mineral release the microcline from the quartz and other impurities upon crushing, but furthermore, the crystals of the microcline and of the quartz were large enough to withstand actual splitting of the crystals themselves. Such splitting of the crystals is essential to the success of Step 6 of this dry process. The resultant particle size (the critical size range of this invention) should not be greater than No. 8 mesh nor finer than No. 100 mesh (United States Standard Sieve Series).

It is not sufficient to merely crush the mineral to a grain size which liberates the quartz crystals from the microcline. Quartz is harder and tougher than microcline, and it is quite natural and common to find that a crushed pegmatite will be composed of a mixture of thoroughly broken microcline crystals with mostly unbroken crystals of quartz, having their size and shape intact as they were present in the pegmatite. There are two reasons why such original unsplit crystals are unsuitable for the electrostatic treatment of Step 6. First, the shape of the particles is generally blocky, cubical or egg-like, which shapes happen to be the least desirable for electrostatic reaction. The surface area is at a minimum in relation to cross-section and weight. Electrostatic reaction is a surface reaction and the optimum condition is high surface exposure per particle and per unit weight. The ideal shape is thin splinters or wafers, preferably with sharp edges and points.

Second, the unbroken quartz crystals which have been released from a pegmatite matrix still retain a thin envelope of matrix coating on the surfaces of the particle. This coating, even though it may be of variable thickness and, in some cases, an almost undiscernible film, nevertheless acts as an insulator in an electrostatic field. Such crystals or particles should be split to expose clean quartz surfaces which will be readily reactive.

In the present electrostatic treatment of ores, the quartz particles are treated with hydrofluoric acid. This treatment produces a reactive quartz which responds to electrostatic treatment and permits separation of the quartz from the feldspar. There are many disadvantages of the hydrofluoric acid treatment method as compared with the present invention. Hydrofluoric acid has a damaging effect upon equipment causing rapid breakdown and a deterioration necessitating costly periodic repairs. Furthermore, the cost of the hydrofluoric acid adds to the cost of the operation. The present invention avoids corrosive chemical treatment which heretofore has been necessary to obtain a clean surface responsive to electrotatic treatment. The splitting of the particles exposes clean quartz surfaces avoiding the necessity of having to treat with hydrofluoric acid or other chemicals.

STEP 2

*Crushing to produce split crystals*

After the petrographic study referred to above, a substantial quantity of mineral was crushed down to ¾″ size by jaw-crusher, and following this primary crushing, a secondary reduction was made by a roll-crusher, set to produce a No. 20 mesh and finer product. (Drying by heated air down to 2% maximum moisture may be required following the primary crushing and prior to the secondary reduction.) A roll type of crusher was selected since it is known to produce a splinter type of particle with a minimum of fines or dust. Other types of crushers which can accomplish splintering of crystals are: Rod mill, hammer mill, and impactor. The setting of the rolls to accomplish a splitting of the crystals of feldspar and quartz was determined by the size of the crystals in the pegmatite dike X, which in this instance, were known to be larger than a No. 20 mesh particle in cross-section, as disclosed in the petrographic study referred to above. If the petrographic study had indicated crystal sizes considerably smaller than the ⅛″ to ⅜″ actually found in this mineral, a closer setting would have been made on the roll-crusher. For instance, if another pegmatite mineral should prove to have a preponderance of quartz crystals of a size range of 1/32″ to ⅛″, the rolls should be set to produce a No. 40 mesh product. Such a setting would successfully split or fracture the crystals to produce splinter shape particles with clean broken surfaces. Steps 5 and 6 also require a minimum of fine particle sizes. For speed and efficiency in electromagnetic and electrostatic separation, the particles should not be smaller than No. 100 mesh size. Finer sizes than No. 100 mesh and particularly dusty material of a range of 200 mesh and finer, cause interference in the flow-speed and have an insulating action which prevents freedom of reactance in the electrical fields. It is obvious that the petrographic study mentioned above, may be made by electronic equipment to determine the crystal sizes and automatically control the crusher adjusting mechanism.

STEP 3

*Screening out of flake mica*

Following the above crushing and splitting operation, the material was screened through a 20 mesh sieve to screen out the flake mica which interferes with the electrostatic field treatment. The material remaining on the 20 mesh sieve was collected for salvage of mica. The mica proved to be a mixture of muscovite and biotite although the quantity was small. The separation of the valuable muscovite from the worthless biotite was accomplished by high intensity electromagnetic induction. This was accomplished by passing the material through a field intensity of 25,000 Maxwell units. This field intensity may vary depending upon ore conditions, from at least 10,000 to 75,000 or more Maxwell units. The biotite was attracted by this magnetic field whereas the muscovite was inert at that intensity. The biotite was discarded. The muscovite proved to be a coarse flake which was suitable for milling further to produce fine ground mica for the paint industry.

An examination made of the material which had gone through the 20 mesh sieve under a binocular microscope showed that the microcline, the quartz, and the tourmaline had been well freed from each other. Most of the biotite and muscovite had disappeared, since in the roll-crushing these resilient materials had squeezed through the crushing rolls without breaking down and were thus retained on the 20 mesh screen. The muscovite remaining in the material which had gone through the 20 mesh sieve was quite free from the microcline and most of the biotite was also free, although there was some adherence of biotite to quartz. The garnet was in fine grain sizes and was quite free from the the other crystals. The crushed particles of microcline and quartz appeared to be quite clean and sharp. There were very few particles of quartz which showed any film and no whole unsplit crystals of quartz or microcline were visible. From the examination it was concluded that the crushed material needed no special cleaning or preparation under Step 4 for the beneficiation process.

STEP 4

*Screening plus air cleaning of the crushed grains to remove dust coatings on the important mineral crystals or fluo-dry unit treatment*

If the mineral particles had been coated with dust, or if a substantial amount of particles of No. 200 mesh size and finer had been present, screening out of the fines along with air suction or aspiration would have been necessary.

In place of the usual air cleaning and screening a fluo-dry unit may be used. In this operation the split crystals are aerated with heated air, to blow out the fine particles and dust and thus clean the crystals and eliminate such particles finer than No. 100 mesh. The elimination of such fine particles not only cleans dusty coatings from the crystals and thus makes them more reactive, but also secures a free flowing mixture of granular material which will react more quickly and more completely in the electrical steps to follow. The presence of fines and dust in electrical treatments is a handicap to efficiency for two reasons: First, the bulky dispersal of these fine particles acts as an insulator in both a magnetic and an electrostatic field. Second, the fine particles become entrained with the activated coarser particles and are carried by such coarser activated particles over into the collecting area for activated material even though such fine particles may themselves be inert. "Magnetically removed" and "electrostatically removed" fractions, therefore, frequently are of a higher percentage than is theoretically proper due to the presence of these "trailing fines." In the fluo-dry unit, the air is heated in a combustion chamber under a slight pressure, the heated air then is conducted in a pressure type chamber where it permeates through a porous ceiling of said chamber. The porous ceiling, which is built of diffuser tile, also acts as a floor for another chamber above it, which is the container for the crushed mixture of split crystals. The heated air blows up through the mixture and the mineral is well aerated to a bouncing condition which simultaneously heats the crystals and also releases the fines and dust which are carried out through a stack attached to the upper part of the aeration chamber. The stack is equipped with a dust collector for salvaging the fines and dust. The granular heated material is in constant motion and as raw material is loaded in at one end of the aeration chamber, an equivalent quantity overflows through an outlet pipe at the other end of the chamber. The aeration and heating thus becomes a continuous operation and the amount of heat, the pressure of air, the volume of air, the weight of mineral, can be adjusted and balanced to achieve temperature control of the outgoing mineral and also the tonnage rate per hour. The temperature of the outgoing mineral in this case is 200° F., approximately. This type of unit is economical for removing fine particles, and is also economical for heating granular material. Other methods of accomplishing these results can also be used, such as screening along with air suction, or by using an air-swept heated tumbling barrel. If the material is processed by the fluo-dry unit treatment in Step 4 rather than by ordinary screening and air cleaning, the heating, drying and agitation in Step 6 of Figure 1 and Step 5A of Figure 2 may not be required.

STEP 5

*Subjecting the crushed mineral to a range of various selected fields of high-intensity induced magnetism*

The screened material of Step 3 was then put through a standard high-intensity induced magnetic separator capable of applying successively to the material a series of increasing Maxwell intensities to cause the attraction and separation of the various materials from the principal minerals, as follows:

| Item: | Intensity |
|---|---|
| Metallic iron | 1,000 to 5,000 |
| Garnet | 5,000 to 10,000 |
| Biotite | 5,000 to 25,000 |
| Tourmaline | 5,000 to 80,000 |
| Muscovite | 80,000 |
| Other faintly magnetic materials | 85,000 |

The materials listed above are separated out at the various stages of operation generally beginning with a low intensity stage of about 1,000 to 50,000 Maxwell units and working up to a high-intensity stage of about 85,000 Maxwell units or more. The material could be run through a machine a number of times, changing the intensity at each run, or the machine could have more than one magnetic field, each field having a different intensity.

The inert material which was not attracted by the above induced magnetic fields proved to be a clean white product having the following chemical analysis:

| | Percent |
|---|---|
| $SiO_2$ | 75.0 |
| $Al_2O_3$ | 14.8 |
| $K_2O$ | 6.0 |
| $Na_2O$ | 3.0 |
| $CaO$ | 0.965 |
| $Fe_2O_3$ | 0.035 |
| Ign. loss | 0.2 |
| | 100.000 |

The inert material analyzed above amounted to 88% of the sample. The balance of the 12% which contained principally materials of garnet, biotite, tourmaline, muscovite and other iron bearing materials may be subjected to a further refining by roll-crushing to a smaller particle size and again running the material through the high-intensity induced magnetic separator.

STEP 6

*Subjecting the split crystals to a field of electrostatic force*

The 88% of concentrate was then processed through an electrostatic field for removal of quartz. This operation was conducted under controlled conditions to insure absolute dryness of the surfaces of the mineral particles. The material was heated mildly (at approximately 200° F.). (The heating treatment may not be required where the ore is taken from extremely arid regions. Certain ores from humid regions may contain considerable moisture and high heat may drive this moisture to the surface requiring longer heating periods to remove this surface moisture. It is, therefore, advisable in the latter instance that the heat which is applied to the ore be sufficient to remove the surface moisture already on the ore but not such as to cause sweating of the ore.) During the heating operation the material was agitated. The heating and agitation take place immediately before loading the concentrate into the hopper of a standard electrostatic separator to insure surface dryness and also to stimulate the crystals to maximum static reactivity. The purpose of this final Step 6 is to separate the quartz crystals from the microcline feldspar crystals. Microcline is relatively inert to electrostatic charges. Quartz crystals pick up a negative charge momentarily upon heating and agitation and are attracted or repelled by opposite or similar charges respectively when passed through an electrostatic field.

The warm, dry pegmatite concentrate, after heating and agitation, was then fed from the hopper into an inclined chute, which permitted the material to slide gently into the electrostatic field. At the end of this chute, the material was fed on to a rotating negatively charged roll, which roll was part of the electrostatic circuit. The rotating roll in turn dropped the material through a one inch gap of positive static electricity at a minimum voltage of approximately 10,000 volts. 25,000 volts has proved most economical and is satisfactory under most conditions though considerably higher voltages may be used. The static field was emitted from an electrode across this 1" space toward the rotating "ground" roll. The quartz was attracted toward the positive electrode and repelled away from the negative ground roll. This attraction and repulsion caused a deflection in direction of the falling quartz and thus the quartz fell away from the vertical stream of inert microcline feldspar and was collected separately below the positive electrode. The separation of quartz from microcline was very successful and the two principal products collected were of high purity, as shown by the chemical analysis below:

|  | Microcline, percent | Quartz, percent |
| --- | --- | --- |
| $SiO_2$ | 67.6 | 96.2 |
| $Al_2O_3$ | 18.9 | 2.5 |
| $K_2O$ | 8.6 | 1.0 |
| $Na_2O$ | 4.0 | .18 |
| $CaO$ | .87 | .10 |
| $Fe_2O_3$ | .03 | .02 |
|  | 100.00 | 100.00 |

The quartz amounted to approximately 25% of the weight of the total inert mineral obtained from Step 5. The feldspar amounted to 55% of the weight and middlings which were suitable for recirculation amounted to 20%. Upon re-running the middlings, an additional 10% of microcline was obtained, giving a total yield of 65% microcline.

The quality of the microcline feldspar classified the product as a high grade potash feldspar, which under present standards, was suitable with its existing mesh sizing for use in glass, or in any pottery product after further milling down to flour.

The quartz was pure enough for many applications and could be used as glass sand or potters flint because of the low iron content.

The total yield of feldspar from the original pegmatite sample by this six step process amounted to 56%. The muscovite mica salvage amounted to .5%.

The quartz yield from the original pegmatite sample amounted to 30.6%. The losses of biotite flake amounted to 1.6%.

The gross losses on magnetic removal mounted to 11.3%.

It is expected that the yield of feldspar will probably reach 60% in large scale production. This is a higher yield on such a pegmatite than is possible with any other process known heretofore and the operating costs of this process are also considerably lower than other known processes.

The above steps of this new process may be varied in order of sequence somewhat and Steps 3 and 4 are to be considered as optional and not essential in all cases. Step 3 can be eliminated if there is no appreciable amount of mica. Step 4 was not necessary on the mineral from the pagmatite dike X since the crystal sizes and the type of crusher used were both favorable; however, on many pegmatites, such as North Carolina deposits, there is considerable clay, shale or kaolinite which has developed during the geological history of the pegmatite. Such clay, shale, or kaolinite produces dust in crushing the crystals and the electrical treatments are ineffective without cleaning and removing this inert, insulating layer from the crystal surfaces. Where the clay, shale, or kaolinite is considerable, a water washing or "desliming" operation followed by drying, may be required preferably after Step 2 and before Step 3. The primary crushing in Step 2 may not be necessary where the mineral to be processed is a pegmatite or granite sand.

ALTERNATIVE METHOD—FIGURE 2

The process as carried out on pegmatite dike X and as illustrated in the flow diagram shown in Fig. 1 may have Steps 5 and 6 reversed as shown in the flow diagram in Fig. 2 of the drawings.

Since the principal mineral to be obtained is feldspar and since the feldspar concentrate would normally receive the full treatment in both the magnetic and electrostatic step, the Steps 5 and 6 may be reversed.

Quartz is a byproduct of low value. It is saleable only locally near the mining source. It is worth about three to five dollars per ton delivered at a glass plant and from eight to twelve dollars a ton in powdered form at pottery plants. The quartz, therefore, is not valuable enough to process thoroughly in most locations. In the alternative process, the split crystals from Step 4 will then go to the electrostatic treatment of Step 5A at which time the quartz product will be discarded. Following Step 5A, the remaining mineral will then go through the high-intensity magnetic field of Step 6A. The advantage in this procedure is that the quartz which amounted to 30.6% of the pegmatite dike X will have been eliminated from the high-intensity magnetic treatment of Step 6A thereby eliminating 30% of the tonnage which would normally pass through Step 6A in the treatment of the ore according to the process shown in the flow diagram illustrated in Fig. 1 and heretofore described. Figure 2 of the flow diagram indicates that the middlings may be recirculated for further separation. In the alternative process of Figure 2, more intensive air cleaning and screening or fluo-dry unit treatment may be required to remove the small flake mica than is necessary under the procedure outlined in Figure 1.

Frequently, more than one mineral is present in the ore which picks up an electrostatic charge. If these minerals pick up opposite charges, a series of electrostatic field treatments will be required. The ore is passed first through a field having one charge and then through a field having an opposite charge in order to separate the minerals which are capable of picking up a charge from the inert minerals. The ore may be run a number of times through apparatus in which the field may be reversed or through apparatus having a series of fields opposite in charge.

While the invention has been described in connection with different embodiments thereof, it will be understood that it is capable of further modification and may be used in the processing of other ores and crystals such as, for example, fluorspar or fluorite, cryolite, rutile, magnesite, nephelite, kyanite, talc and zircon, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention, what I claim is:

1. The method of preparing an ore for electrostatic separation of a non-inert mineral capable of picking up an electrostatic charge from a mineral inert to an electrostatic charge comprising the steps of drying the ore, setting a crusher to a tolerance of between No. 8 and No. 100 mesh as determined by the size of the crystals of the inert and the non-inert minerals to splinter substantially all of the crystals of the inert and the non-inert minerals in the ore to produce splinters of the inert and the non-inert minerals with exposed clean surfaces, crushing the dried ore in the crusher, scalping the crushed ore by screening, air cleaning and screening the scalped ore containing the splinters of the inert and the non-inert minerals to remove the dust and fines, and running the air cleaned and screened ore through a series of hi-intensity induced magnetic fields of from 1,000 to 5,000, 5,000 to 10,000, 5,000 to 25,000, 5,000 to 80,000 and 80,000 to 85,000 Maxwell units to remove from the ore respectively metallic iron, garnet, biotite, tourmaline, muscovite and other faintly magnetic materials.

2. The method of preparing an ore as in claim 1 and in which the ore is pegmatite, the non-inert mineral is quartz, and the inert mineral is feldspar.

3. The method of preparing an ore for electrostatic separation of a non-inert mineral capable of picking up an electrostatic charge from a mineral inert to an electrostatic charge comprising the steps of drying the ore, setting a crusher to a tolerance of between No. 8 and No. 100 mesh as determined by the size of the crystals of the inert and the non-inert minerals to splinter substantially all of the crystals of the inert and the non-inert minerals in the ore to produce splinters of the inert and non-inert minerals with exposed clean surfaces, crushing the dried ore in the crusher, scalping the crushed ore by screening, air cleaning and screening the scalped ore containing the splinters of the inert and the non-inert minerals to remove the dust and fines, running the air cleaned and screened ore through a series of hi-intensity induced magnetic fields of from 1,000 to 5,000, 5,000 to 10,000, 5,000 to 25,000, 5,000 to 80,000 and 80,000 to 85,000 Maxwell units to remove from the ore respectively metallic iron, garnet, biotite, tourmaline, muscovite, and other faintly magnetic materials, and heating, drying, and agitating the ore unaffected by the hi-intensity magnetic field treatment.

4. The method of preparing an ore as in claim 3 and in which the ore is pegmatite, the non-inert mineral is quartz, and the inert mineral is feldspar.

5. The method of preparing an ore for electrostatic separation of a non-inert mineral capable of picking up an electrostatic charge from a mineral inert to an electrostatic charge comprising the steps of drying the ore, setting a crusher to a tolerance of between No. 8 and No. 100 mesh as determined by the size of the crystals of the inert and the non-inert minerals to splinter substantially all of the crystals of the inert and the non-inert minerals in the ore to produce splinters of the inert and the non-inert minerals with the exposed clean surfaces, crushing the dried ore, scalping the crushed ore by screening, and running the scalped ore through a fluo-dry unit to remove fines and dust and to heat, dry, and agitate the ore.

6. The method of preparing an ore as in claim 5 and in which the ore is pegmatite, the non-inert mineral is quartz, and inert mineral is feldspar.

7. The method of preparing an ore for electrostatic separation of a non-inert mineral capable of picking up an electrostatic charge from a mineral inert to an electrostatic charge comprising the steps of drying the ore, setting a crusher to a tolerance of between No. 8 and No. 100 mesh as determined by the size of the crystals of the inert and non-inert minerals to splinter substantially all of the crystals of the inert and non-inert minerals in the ore to produce splinters of the inert and non-inert minerals with exposed clean surfaces, crushing the dried ore, scalping the crushed ore by screening, air cleaning and screening the scalped ore containing the splinters of the inert and the non-inert minerals to remove the dust and fines, running the air cleaned and screened ore through a series of hi-intensity induced magnetic fields of from 1,000 to 5,000, 5,000 to 10,000, 5,000 to 25,000, 5,000 to 80,000 and 80,000 to 85,000 Maxwell units to remove from the ore respectively metallic iron, garnet, biotite, tourmaline, muscovite, and other faintly magnetic materials, and heating mildly to a temperature of about 200° F. to dry the ore, and agitating the dried ore.

8. The method of preparing an ore as in claim 7 and in which the ore is pegmatite, the non-inert mineral is quartz, and the inert mineral is feldspar.

9. The method of separating a mineral inert to an electrostatic charge from an ore which comprises the steps of bulk mining the ore, submitting the ore to a primary crushing, submitting the primary crushed ore to a secondary crushing to splinter substantially all of the crystals contained therein to obtain splinters having clean exposed crystalline surfaces, coarse scalping the secondary crushed ore to remove mica tailing, air cleaning and screening the scalped ore to remove dust and fines, submitting the air cleaned and screened ore to a hi-intensity induced magnetic field treatment to remove magnetically affected wastes, heating and agitating the hi-intensity induced magnetic field treated ore to develop electrostatic charges on the splinters, submitting the agitated and heated ore to an electrostatic field treatment by dropping the ore through a hi-voltage electrostatic field to remove the electrostatically affected wastes from the inert mineral.

10. A method of separating a mineral inert to an eletcrostatic charge from an ore which comprises the steps of bulk mining the ore, submitting the ore to a primary crushing, submitting the primary crushed ore to a secondary crushing to splinter substantially all of the crystals contained therein to obtain splinters having clean surfaces, coarse scalping the secondary crushed ore to remove mica tailings, air cleaning and screening the scalped ore to remove dust and fines, submitting the air cleaned and screened ore to a hi-intensity induced magnetic field treatment of from 1,000 to 85,000 Maxwell units to remove magnetically affected wastes, heating and agitating the hi-intensity induced magnetic field treated ore to develop electrostatic charges on the splinters, submitting the agitated and heated ore to an electrostatic field treatment by dropping the ore through a hi-voltage electrostatic field of at least 10,000 volts to remove the electrostatically affected wastes from the inert mineral.

11. A method of separating a mineral inert to an electrostatic charge from an ore which comprises the steps of bulk mining the ore, submitting the ore to a primary crushing, submitting the primary crushed ore to a secondary crushing to splinter substantially all of the crystals contained therein to obtain splinters of from No. 8 mesh to No. 100 mesh having clean exposed crystalline surfaces, coarse scalping the secondary crushed ore to remove mica tailings, air cleaning and screening the scalped ore to remove dust and fines, submitting the air cleaned and screened ore to a hi-intensity induced magnetic field treatment of from 1,000 to 85,000 Maxwell units to remove magnetically affected wastes, heating and agitating the hi-intensity induced magnetic field treated ore to develop electrostatic charges on the splinters, submitting the agitated and heated ore to an electrostatic field treatment by dropping the ore through a hi-voltage electrostatic field of at least 10,000 volts to remove the electrostatically affected wastes from the inert mineral.

12. A method of separating a mineral inert to an electrostatic charge from an ore which comprises the steps of bulk mining the ore, submitting the ore to a primary crushing, drying the primary crushed ore to 2% maximum moisture content, submitting the primary crushed dried ore to a secondary crushing to splinter substantially all of the crystals contained therein to obtain splinters of from No. 8 mesh to No. 100 mesh having clean exposed crystalline surfaces, coarse scalping the secondary crushed ore to remove mica tailings, air cleaning and screening the scalped ore to remove dust and fines, submitting the air cleaned and screened ore to a hi-intensity induced magnetic field treatment of from 1,000 to 85,000 Maxwell units to remove magnetically affected wastes, heating and agitating the hi-intensity induced magnetic field treated ore to develop electrostatic charges on the splinters, submitting the agitated and heated ore to an electrostatic field treatment by dropping the ore through a hi-voltage electrostatic field of at least 10,000 volts to remove the electrostatically affected wastes from the inert mineral.

13. A method of separating a mineral inert to an electrostatic charge from an ore which comprises the steps of bulk mining the ore, submitting the ore to a primary crushing, drying the primary crushed ore to 2% maximum moisture content, submitting the primary crushed dried ore to a secondary crushing to splinter substantially all of the crystals contained therein to obtain splinters of from No. 8 mesh to No. 100 mesh having clean exposed crystalline surfaces, coarse scalping the secondary crushed ore to remove mica tailings, air cleaning and screening the scalped ore to remove dust and fines, submitting the air cleaned and screened ore to a hi-intensity induced magnetic field treatment of from 1,000 to 85,000 Maxwell units to remove magnetically affected wastes, heating to 200° F. and agitating the hi-intensity induced magnetic field treated ore to develop electrostatic charges on the splinters, submitting the agitated and heated ore to an electrostatic field treatment by dropping the ore through a hi-voltage electrostatic field of at least 10,000 volts to remove the electrostatically affected wastes from the inert mineral.

14. A method of separating a mineral inert to an electrostatic charge from an ore which comprises the steps of bulk mining the ore, submitting the ore to a primary crushing, drying the primary crushed ore to 2% maximum moisture content, submitting the primary crushed dried ore to a secondary crushing to splinter substantially all of the crystals contained therein to obtain splinters of from No. 8 mesh to No. 100 mesh having clean exposed crystalline surfaces, submitting the secondarily crushed ore to a desliming operation, coarse scalping the deslimed secondarily crushed ore to remove mica tailings, drying, air cleaning and screening the scalped ore to remove dust and fines, submitting the air cleaned and screened ore to a hi-intensity induced magnetic field treatment of from 1,000 to 85,000 Maxwell units to remove magnetically affected wastes, heating to 200° F. and agitating the hi-intensity induced magnetic field treated ore to develop electrostatic charges on the splinters, submitting the agitated and heated ore to an electrostatic field treatment by dropping the ore through a hi-voltage electrostatic field of at least 10,000 volts to remove the electrostatically affected wastes from the inert mineral.

15. The method of separating a mineral inert to an electrostatic charge from an ore which comprises the steps of bulk mining the ore, submitting the ore to primary crushing, submitting the primary crushed ore to a secondary crushing to splinter substantially all of the crystals contained therein to obtain splinters having clean exposed crystalline surfaces, coarse scalping the secondary crushed ore to remove mica tailings, air cleaning and screening the scalped ore to remove mica, dust and fines, heating and agitating the air cleaned and screened ore to develop electrostatic charges on the splinters, submitting the heated and agitated ore to an electrostatic field treatment by dropping the ore through a hi-voltage electrostatic field to remove waste material, and subjecting the hi-voltage electrostatic field treated ore to a hi-intensity magnetic field treatment to separate the inert mineral from the remaining waste material.

16. The method of separating a mineral inert to an electrostatic charge from an ore which comprises the steps of bulk mining the ore, submitting the ore to primary crushing, submitting the primary crushed ore to a secondary crushing to splinter substantially all of the crystals contained therein to obtain splinters having clean exposed crystalline surfaces, coarse scalping the secondary crushed ore to remove mica tailings, air cleaning and screening the scalped ore to remove mica, dust and fines, heating and agitating the air cleaned and screened ore to develop electrostatic charges on the splinters, submitting the heated and agitated ore to an electrostatic field treatment by dropping the ore through a hi-voltage electrostatic field of at least 10,000 volts to remove waste material, and subjecting the hi-voltage electrostatic field treated ore to a hi-intensity magnetic field treatment of from 1,000 to 85,000 Maxwell units to separate the inert mineral from the remaining waste material.

17. The method of separating a mineral inert to an electrostatic charge from an ore which comprises the steps of bulk mining the ore, submitting the ore to primary crushing, submitting the primary crushed ore to a secondary crushing to splinter substantially all of the crystals contained therein to obtain splinters of from No. 8 mesh to No. 100 mesh having clean exposed crystalline surfaces, coarse scalping the secondary crushed ore to remove mica tailings, air cleaning and screening the scalped ore to remove mica, dust and fines, heating and agitating the air cleaned and screened ore to develop electrostatic charges on the splinters, submitting the heated and agitated ore to an electrostatic field treatment by dropping the ore through a hi-voltage electrostatic field of at least 10,000 volts to remove waste material, and subjecting the hi-voltage electrostatic field treated ore to a hi-intensity magnetic field treatment of from 1,000 to 85,000 Maxwell units to separate the inert mineral from the remaining waste material.

18. The method of separating a mineral inert to an electrostatic charge from an ore which comprises the steps of bulk mining the ore, submitting the ore to primary crushing, drying the primary crushed ore to 2% maximum moisture content, submitting the primary crushed dried ore to a secondary crushing to splinter substantially all of the crystals contained therein to obtain splinters of from No. 8 mesh to No. 100 mesh having clean exposed crystalline surfaces, coarse scalping the secondary crushed ore to remove mica tailings, air cleaning and screening the scalped ore to remove mica, dust and fines, heating and agitating the air cleaned and screened ore to develop electrostatic charges on the splinters, submitting the heated and agitated ore to an electrostatic field treatment by dropping the ore through a hi-voltage electrostatic field of at least 10,000 volts to remove waste material, and subjecting the hi-voltage electrostatic field treated ore to a hi-intensity magnetic field treatment of from 1,000 to 85,000 Maxwell units to separate the inert mineral from the remaining waste material.

19. The method of separating a mineral inert to an electrostatic charge from an ore which comprises the steps of bulk mining the ore, submitting the ore to primary crushing, drying the primary crushed ore to 2% maximum moisture content, submitting the primary crushed dried ore to a secondary crushing to splinter substantially all of the crystals contained therein to obtain splinters of from No. 8 mesh to No. 100 mesh having clean exposed crystalline surfaces, coarse scalping the secondary crushed ore to remove mica tailings, air cleaning and screening the scalped ore to remove mica, dust and fines, heating to 200° F. and agitating the air cleaned and screened ore to develop electrostatic charges on the splinters, submitting the heated and agitated ore to an electrostatic field treatment by dropping the ore through a hi-voltage electrostatic field of at least 10,000 volts to remove waste material, and subjecting the hi-voltage electrostatic field treated ore to a hi-intensity magnetic field treatment of from 1,000 to 85,000 Maxwell units to separate the inert mineral from the remaining waste material.

20. The method of separating a mineral inert to an electrostatic charge from an ore which comprises the steps of bulk mining the ore, submitting the ore to primary crushing, drying the primary crushed ore to 2% maximum moisture content, submitting the primary crushed dried ore to a secondary crushing to splinter substantially all of the crystals contained therein to obtain splinters of from No. 8 mesh to No. 100 mesh having clean exposed crystalline surfaces, submitting the secondary crushed ore to a desliming operation, coarse scalping the secondary deslimed crushed ore to remove mica tailings, drying, air cleaning and screening the scalped ore to remove mica, dust and fines, heating to 200° F. and agitating the air cleaned and screened ore to develop electrostatic charges on the splinters, submitting the heated and agitated ore to an electrostatic field treatment by dropping the ore through a hi-voltage electrostatic field of at least 10,000 volts to remove waste material, and subjecting the hi-voltage electrostatic field treated ore to a hi-intensity magnetic field treatment of from 1,000 to 85,000 Maxwell units to separate the inert mineral from the remaining waste material.

21. The method of separating a mineral inert to an electrostatic charge from an ore which comprises the steps of bulk mining the ore submitting the ore to primary crushing, drying the primary crushed ore to 2% maximum moisture content, submitting the primary crushed dried ore to a secondary crushing to splinter substantially all of the crystals contained therein to obtain splinters of from No. 8 mesh to No. 100 mesh having clean exposed crystalline surfaces, submitting the secondary crushed ore to a desliming operation, coarse scalping the secondary deslimed crushed ore to remove mica tailings, submitting the scalped ore to a fluo-dry treatment, submitting the fluo-dry treated ore to an electrostatic field treatment by dropping the ore through a hi-voltage electrostatic field of at least 10,000 volts to remove waste material, and subjecting the hi-voltage electrostatic field treated ore to a hi-intensity magnetic field treatment of from 1,000 to 85,000 Maxwell units to separate the inert mineral from the remaining waste material.

22. The method of separating a mineral inert to an electrostatic charge from an ore as in claim 9, wherein the inert mineral is feldspar and the ore is pegmatite.

23. The method of separating a mineral inert to an electrostatic charge from an ore as in claim 10, wherein the inert mineral is feldspar and the ore is pegmatite.

24. The method of separating a mineral inert to an electrostatic charge from an ore as in claim 11, wherein the inert mineral is feldspar and the ore is pegmatite.

25. The method of separating a mineral inert to an electrostatic charge from an ore as in claim 12, wherein the inert mineral is feldspar and the ore is pegmatite.

26. The method of separating a mineral inert to an electrostatic charge from an ore as in claim 13, wherein the inert mineral is feldspar and the ore is pegmatite.

27. The method of separating a mineral inert to an electrostatic charge from an ore as in claim 14, wherein the inert mineral is feldspar and the ore is pegmatite.

28. The method of separating a mineral inert to an electrostatic charge from an ore as in claim 15, wherein the inert mineral is feldspar and the ore is pegmatite.

29. The method of separating a mineral inert to an electrostatic charge from an ore as in claim 16, wherein the inert mineral is feldspar and the ore is pegmatite.

30. The method of separating a mineral inert to an electrostatic charge from an ore as in claim 17, wherein the inert mineral is feldspar and the ore is pegmatite.

31. The method of separating a mineral inert to an electrostatic charge from an ore as in claim 18, wherein the inert mineral is feldspar and the ore is pegmatite.

32. The method of separating a mineral inert to an electrostatic charge from an ore as in claim 19, wherein the inert mineral is feldspar and the ore is pegmatite.

33. The method of separating a mineral inert to an electrostatic charge from an ore as in claim 20, wherein the inert mineral is feldspar and the ore is pegmatite.

34. The method of separating a mineral inert to an electrostatic charge from an ore as in claim 21, wherein the inert mineral is feldspar and the ore is pegmatite.

References Cited in the file of this patent

UNITED STATES PATENTS

| | | |
|---|---|---|
| 548,377 | Lovett | Oct. 22, 1895 |
| 1,404,974 | Knight | Jan. 31, 1922 |
| 1,999,825 | Saklatwalls | Apr. 30, 1935 |
| 2,078,513 | Stearns | Apr. 27, 1937 |
| 2,094,440 | Weis | Sept. 28, 1937 |
| 2,175,484 | Rees | Oct. 10, 1939 |
| 2,254,135 | Boer | Aug. 26, 1941 |